United States Patent
Goel et al.

(10) Patent No.: US 11,910,306 B2
(45) Date of Patent: Feb. 20, 2024

(54) METHODS, SYSTEMS, AND COMPUTER READABLE MEDIA FOR PROVIDING UPDATED NETWORK SLICE INFORMATION TO A NETWORK SLICE SELECTION FUNCTION (NSSF)

(71) Applicant: Oracle International Corporation, Redwood Shores, CA (US)

(72) Inventors: Yesh Goel, Bangalore (IN); John Nirmal Mohan Raj, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/382,299

(22) Filed: Jul. 21, 2021

(65) Prior Publication Data
US 2023/0025799 A1  Jan. 26, 2023

(51) Int. Cl.
*H04W 48/18* (2009.01)
*H04W 8/18* (2009.01)
(Continued)

(52) U.S. Cl.
CPC ............. *H04W 48/18* (2013.01); *H04W 8/18* (2013.01); *H04W 60/00* (2013.01); *H04W 68/005* (2013.01)

(58) Field of Classification Search
CPC ....... H04W 48/18; H04W 8/18; H04W 60/00; H04W 68/005; H04W 8/00; H04W 24/02;
(Continued)

(56) References Cited

U.S. PATENT DOCUMENTS

2019/0223055 A1* 7/2019 Bor Yaliniz ........ H04L 41/0896
2019/0356558 A1* 11/2019 Han ........................ H04L 67/51
(Continued)

FOREIGN PATENT DOCUMENTS

EP         3 648 525 A1   5/2020
WO    WO-2021/054781 A1   3/2021

OTHER PUBLICATIONS

"3rd Generation Partnership Project; Technical Specification Group Services and System Aspects; Management and orchestration; Provisioning; (Release 16)," 3GPP TS 28.531, V16.9.0, pp. 1-73 (Mar. 2021).

(Continued)

*Primary Examiner* — Marcus Hammonds
(74) *Attorney, Agent, or Firm* — Jenkins, Taylor & Hunt, P.A.

(57) ABSTRACT

A method for providing updated network slice information to a network slice selection function (NSSF includes registering, by a network slice management function (NSMF) with a network function (NF) repository function (NRF), an NF profile corresponding to the NSMF and subscribing, by the NSMF with the NRF, for status updates corresponding to NF instances belonging to network slice instances created by the NSMF. The method further includes receiving, by the NSMF from the NRF, a notification message including one or more network traffic load level updates related to at least one of the NF instances, processing the one or more network traffic load level updates to generate network slice instance configuration information for at least one of the network slice instances, and providing, by the NSMF, the network slice instance configuration information to a NSSF managing the at least one of the network slice instances.

19 Claims, 4 Drawing Sheets

(51) Int. Cl.
*H04W 60/00* (2009.01)
*H04W 68/00* (2009.01)

(58) Field of Classification Search
CPC ............ H04L 41/5009; H04L 41/5019; H04L 43/0876; H04L 43/20; H04L 41/0895; H04L 41/0897
See application file for complete search history.

(56) References Cited

U.S. PATENT DOCUMENTS

| | | | |
|---|---|---|---|
| 2020/0044943 A1* | 2/2020 | Bor-Yaliniz | H04L 41/5012 |
| 2020/0267214 A1 | 8/2020 | Yang | |
| 2021/0084582 A1* | 3/2021 | Li | H04W 24/02 |
| 2021/0185695 A1* | 6/2021 | Gupta | H04W 72/543 |
| 2022/0132413 A1* | 4/2022 | Hu | H04L 41/5051 |
| 2022/0385581 A1* | 12/2022 | Delos Reyes | H04L 43/062 |

OTHER PUBLICATIONS

"3rd Generation Partnership Project; Technical Specification Group Core Network and Terminals; 5G System; Network Slice Selection Services; Stage 3 (Release 17)," 3GPP TS 29.531, V17.0.0, pp. 1-77 (Mar. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Services and System Aspects; Telecommunication management; Study on management and orchestration of network slicing for next generation network (Release 15)," 3GPP TR 28.801, V15.1.0, pp. 1-75 (Jan. 2018).

"3rd Generation Partnership Project; Technical Specification Group Services and System Aspects; Telecommunication management; Add usecase and requirements for configuring CN with slice specific information (S5-171921)," 3GPP SA WG5 Meeting #112 (Mar. 2017).

International Search Report and Written Opinion corresponding to International Application No. PCT/US2022/037032 dated Sep. 29, 2022.

* cited by examiner

METHODS, SYSTEMS, AND COMPUTER READABLE MEDIA FOR PROVIDING UPDATED NETWORK SLICE INFORMATION TO A NETWORK SLICE SELECTION FUNCTION (NSSF)

TECHNICAL FIELD

The subject matter described herein relates to the communication of network slice information in 5G networks. More particularly, the subject matter described herein relates to methods, systems, and computer readable media for providing updated network slice information to a network slice selection function (NSSF).

BACKGROUND

In 5G telecommunications networks, a network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of Internet protocol (IP) address and port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

One example of an NF that provides services to user equipment (UE) devices, such as Internet of Things (IoT) devices, is the access and mobility management function (AMF). The AMF provides registration management, connection management, reachability management, mobility management, and other services for UE devices. The AMF serves as the point of contact between the radio access network and the remaining nodes in the 5G core network. The AMF also serves as the point of access to network slice services.

Network slicing is a service provided in 5G networks where network resources are logically allocated in portions or slices for use by UE devices. Each network slice may provide particular capabilities or services to a UE. A network slice instance is defined as a set of network functions and the resources for the network functions which are arranged and configured to form and meet a specific set of network requirements or characteristics. For example, a network slice instance for accessing network services may be resources of a virtualized g-Node B and AMF to provide access network services for a UE. A network slice instance for a core network service may include resources of a virtualized NRF and network exposure function (NEF) configured to provide core network services for a UE, such as an IoT, digital call sessions, and the like.

In 5G telecommunications networks, there are scenarios where an AMF is attempting to obtain network slice information from a NSSF. Notably, the AMF requests network slice information from the NSSF when the AMF requests the identity of an appropriate network slice instance for routing a call session for a supported user equipment. One problem that exists is that the NSSF receives updated network slice instance status information from an NRF in an infrequent and static manner. As such, the NSSF may often be provisioned with (or have access to) outdated or inaccurate network slice instance information (e.g., a supported network slice instance recently encounters overload conditions unbeknownst to the NSSF).

Accordingly, in light of these difficulties, there exists a need for methods, systems, and computer readable media for a method for providing updated network slice information to a NSSF.

SUMMARY

A method for providing updated network slice information to a network slice selection function (NSSF) includes registering, by a network slice management function (NSMF) with a network function (NF) repository function (NRF), an NF profile corresponding to the NSMF and subscribing, by the NSMF with the NRF, for status updates corresponding to NF instances belonging to network slice instances created by the NSMF. The method further includes receiving, by the NSMF from the NRF, a notification message including one or more network traffic load level updates related to at least one of the NF instances, processing the one or more network traffic load level updates to generate network slice instance configuration information for at least one of the network slice instances, and providing, by the NSMF, the network slice instance configuration information to a NSSF managing the at least one of the network slice instances.

According to another aspect of the method described herein, the network slice instance configuration information includes instructions for creating additional network slice instances, modifying the network slice instances, or removing one or more of the network slice instances.

According to another aspect of the method described herein, the network slice instance configuration information is provided to the NSSF via an update message pushed by the NSMF.

According to another aspect of the method described herein, the NSSF is configured to request the network slice instance configuration information from the NSMF via a pull message.

According to another aspect of the method described herein, the NSSF is configured to utilize the network slice instance configuration information to respond to network slice selection service request messages.

According to another aspect of the method described herein, the network slice instance configuration information is provided by the NSMF to the NSSF in real time.

According to another aspect of the method described herein, the NSMF registers with the NRF as a custom NF.

According to another aspect of the subject matter described herein, a system for providing updated network slice information to a NSSF, the system comprising a NSMF including at least one processor and a memory. The system further includes an orchestration engine stored in the memory and implemented by the at least one processor for registering with an NRF an NF profile corresponding to the NSMF, subscribing with the NRF for status updates corresponding to NF instances belonging to network slice instances created by the NSMF, receiving from the NRF a notification message including one or more network traffic load level updates related to at least one of the NF instances, processing the one or more network traffic load level updates to generate network slice instance configuration information for at least one of the network slice instances, and providing the network slice instance configuration information to a NSSF managing the at least one of the network slice instances.

According to another aspect of the system described herein, the network slice instance configuration information includes instructions for creating additional network slice instances, modifying the network slice instances, or removing one or more of the network slice instances.

According to another aspect of the system described herein, the network slice instance configuration information is provided to the NSSF via an update message pushed by the NSMF.

According to another aspect of the system described herein, the NSSF is configured to request the network slice instance configuration information from the NSMF via a pull message.

According to another aspect of the system described herein, the NSSF is configured to utilize the network slice instance configuration information to respond to network slice selection service request messages.

According to another aspect of the system described herein, the network slice instance configuration information is provided by the NSMF to the NSSF in real time.

According to another aspect of the system described herein, the NSMF registers with the NRF as a custom NF.

According to another aspect of the subject matter described herein, a non-transitory computer readable medium having stored thereon executable instructions that when executed by a processor of a computer control the computer to perform steps comprising. The steps include registering, by a NSMF with an NRF, an NF profile corresponding to the NSMF and subscribing, by the NSMF with the NRF, for status updates corresponding to NF instances belonging to network slice instances created by the NSMF. The method further includes receiving, by the NSMF from the NRF, a notification message including one or more network traffic load level updates related to at least one of the NF instances, processing the one or more network traffic load level updates to generate network slice instance configuration information for at least one of the network slice instances, and providing, by the NSMF, the network slice instance configuration information to a NSSF managing the at least one of the network slice instances.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
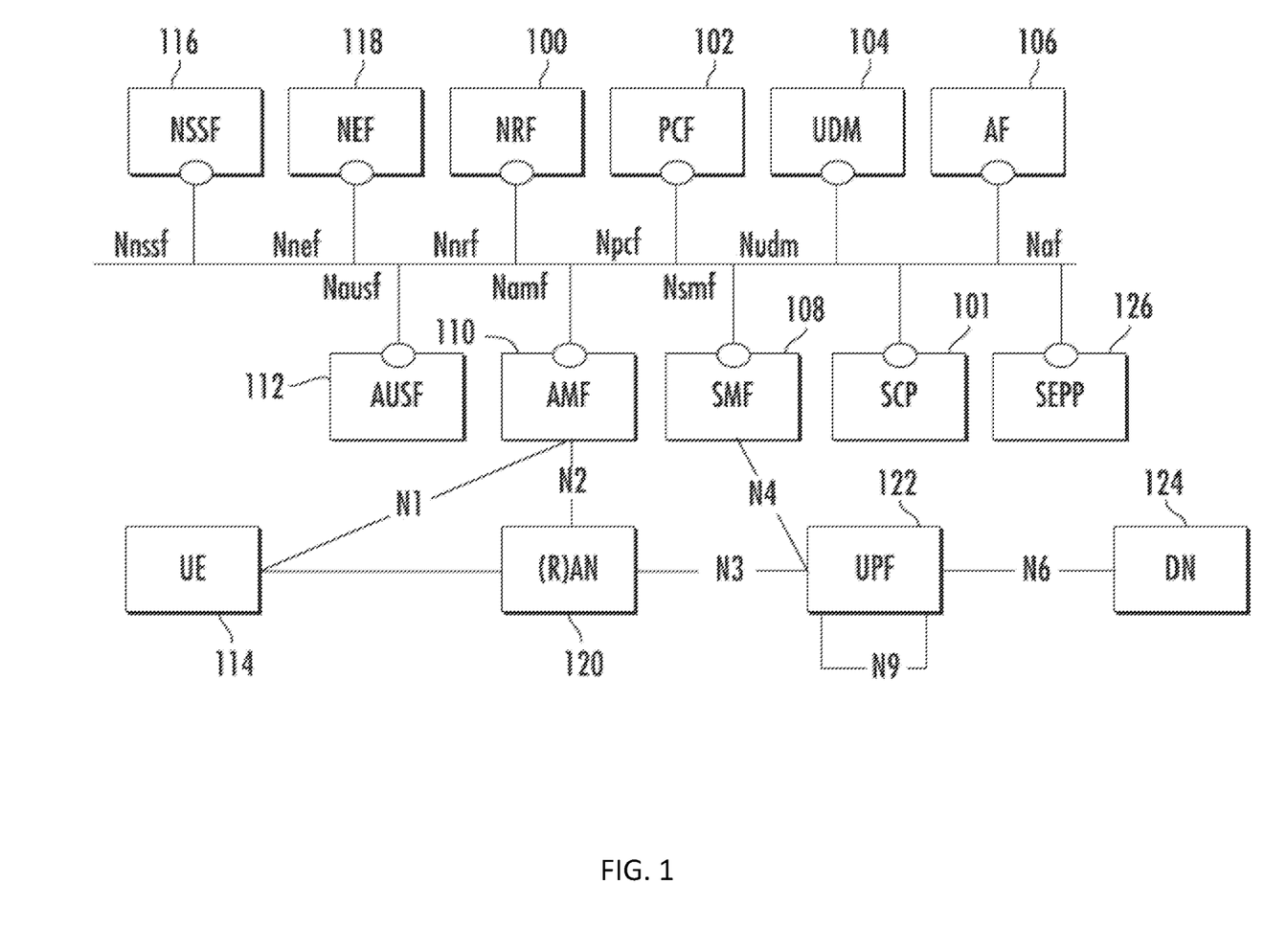
FIG. 1 is a network diagram illustrating an exemplary 5G network architecture according to an embodiment of the subject matter described herein.

FIG. 1 is a block diagram illustrating an exemplary 5G system network architecture. In FIG. 1, the network includes NRF 100 and a service communication proxy (SCP) 101. As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JavaScript object notation (JSON) data structure. The NF profile definition includes at least one of a fully qualified domain name (FQDN), an Internet protocol (IP) version 4 (IPv4) address or an IP version 6 (IPv6) address.

In FIG. 1, any of the nodes (other than SCP 101 and NRF 100) can be either consumer NFs or producer NFs, depending on whether they are consuming or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between AMF 110 and PCF 102. AMF 110 performs mobility and registration management operations similar to those performed by a mobility management entity (MME) in 4G networks. AMF 110 also serves as the access point for network slice services. AMF 110 may also perform AMF selection to select the serving AMF that will provide access to the network slice services requested by a UE during registration.

An authentication server function (AUSF) 112 performs authentication services for user equipment (UEs), such as UE 114, seeking access to the network.

A network slice selection function (NSSF) 116 provides network slice selection assistance information (NSSAI) and NS selection services for devices seeking to access specific network capabilities. NSSF 116 may obtain AMF loading information from an NRF and NSSAI availability information from AMFs. NSSF 116 may store the AMF loading information and NSSAI availability information in an AMF selection database maintained by NSSF 116. When NSSF 116 receives an NSSAI selection request from an AMF, NSSF 116 may utilize 15 the stored AMF loading and NSSAI availability information to compute an AMF relevance score and a weight for each AMF capable of supporting the network slice services requested by a UE seeking access to network slice services. NSSF 116 may generate a prioritized list of AMFs capable of providing the requested services and the corresponding weights and communicate the list to the requesting AMF. The requesting AMF may then use the prioritized list of AMFs and the weights to select an AMF for providing access to the requested network slice services.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionalities for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Service edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse a minimum of two SEPP functions, one for the home PLMN and the other for the foreign PLMN.

As indicated above, network slicing involves providing virtual network functions and allocating resources for the virtual network functions to meet a given requirement. For example, network slicing may involve virtualizing any of the network functions illustrated in FIG. 1 and providing access to services implemented by multiple different network functions as a network slice instance.

At the highest level, network slices are accessible via communication services provided by a communication service provider. Communication services can include business to consumer communication services, such as mobile web browsing, voice over LTE calling, and rich communication services. Communication services can also include business to business services, such as Internet access and local area network (LAN) interconnection.

Network slice as a service can be offered by communication services providers to their customers. Network slice services can be characterized by a number of parameters, including: radio access technology, bandwidth, end-to-end latency, guaranteed/non-guaranteed QoS, security level, etc.

In some embodiments, the disclosed subject matter establishes a mode of exchange of information between a NSMF and a NSSF wherein updates pertaining to network slice instances are directly pushed or provided to the NSSF in real time. For example, an NSSF can be enhanced to expose a representational state transfer (REST) application programming interface (API) that can be utilized by the NSMF to deliver the network slice instance configuration information, which indicates modification changes to a network slice. Notably, the disclosed subject matter affords the automated provisioning of updated network slice instance information at the NSSF based on network traffic load level feedback of network functions and/or NF services received from an NRF. Provisioning of network slice information in this manner will notably avoid and/or obviate intervention by a network operator.

At present, the NSSF exposes a Nnssf_NSSelection_Get service operation that enables network slice selection in both a serving public land mobile network (PLMN) and home public land network (HPLMN). This service operation further enables the NSSF to provide to the AMF with an allowed NSSAI and the configured NSSAI for the serving PLMN. Using this service operation, the NSSF may assign a network slice to a requesting user equipment during the registration procedure, inter-PLMN mobility procedure, PDU session establishment procedure, UE configuration update procedure, and the like. In response to receiving a network slice selection request message (e.g., via the Nnssf_NSSelection_Get service operation), the NSSF selects the network slice instance based on pre-provisioned information. In addition, the NSSF then determines and returns (e.g., via a Nnssf_NSSelection_Get response message) the appropriate NRF to be used to select network functions and/or services within the selected network slice instance.

As indicated above, 3GPP standards do not define any procedure by which the NSMF directly interacts with the NSSF for any updated configuration changes in the generated/supported network slices (e.g., NSIs) as a result of management and orchestration. Moreover, performance data collection typically involves network slice subset management functions (NSSMFs) collecting performance data from NF services and network functions in each network slice instance. This performance data is subsequently provided to the NSMF using a pull mechanism (e.g., NSMF sends a request message). In contrast, the disclosed subject matter employs a more dynamic push-based system as described below.

Figure 2:
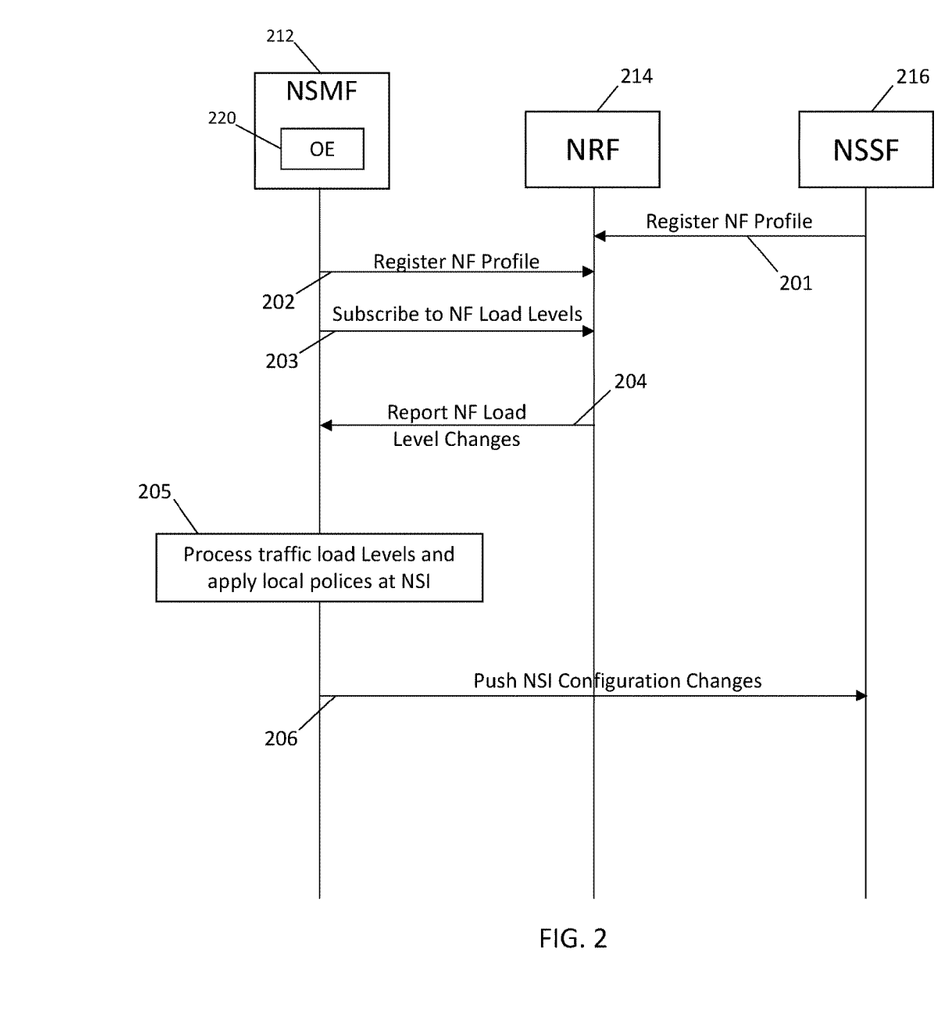
FIG. 2 is a message flow diagram illustrating the communication of network slice instance modification information according to an embodiment of the subject matter described herein.
Figure 3:
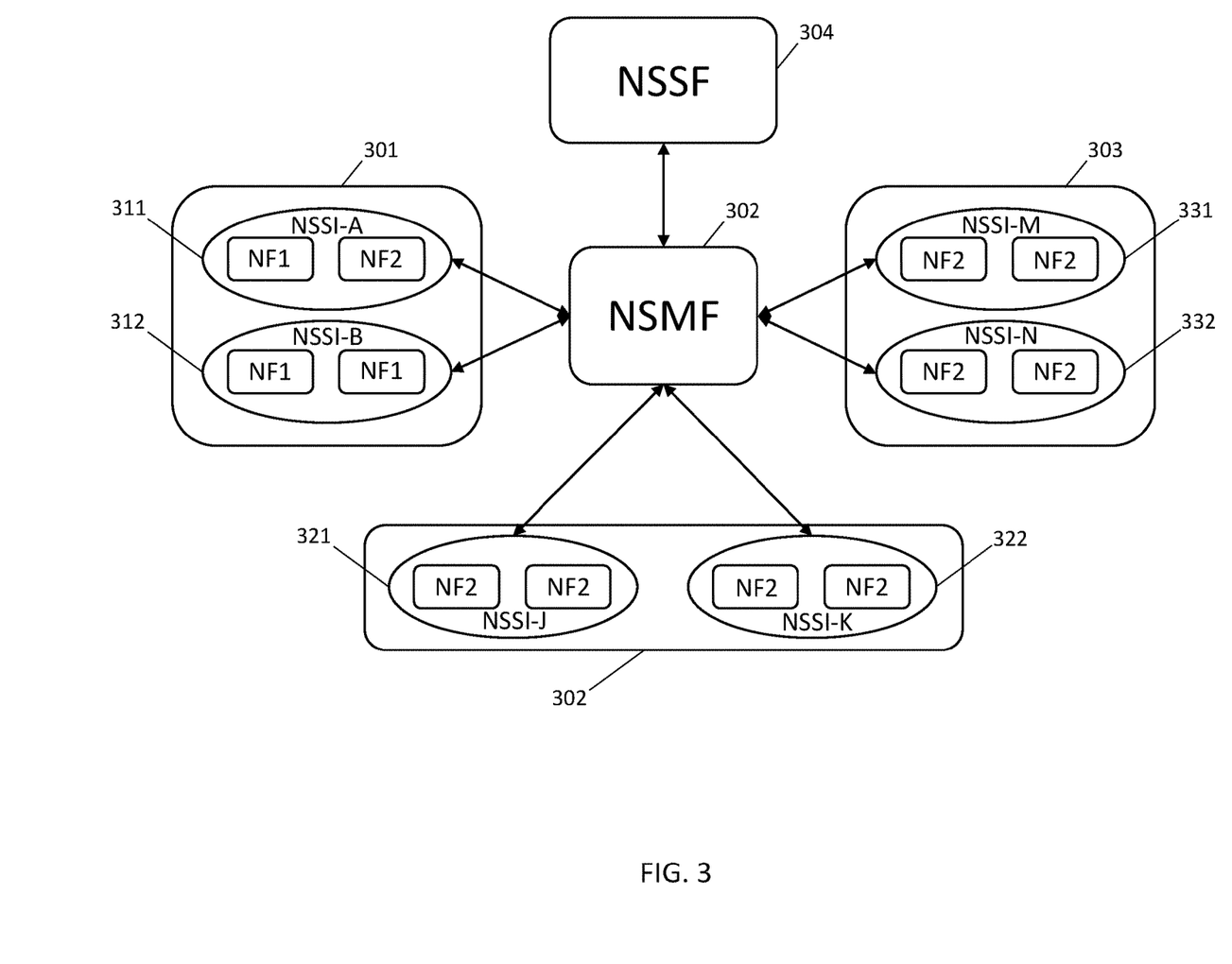
FIG. 3 depicts a network slice instance architecture diagram according to an embodiment of the subject matter described herein.

FIG. 2 is a message flow diagram illustrating the communication of network slice instance modification information according to an embodiment of the subject matter described herein. As shown in FIG. 2, 5G messaging can be conducted between an NSMF 212, NRF 214, and NSSF 216. In some embodiments, NSMF 212 may include an orchestration engine 220 that represents a list of steps (or changes in steps) embodied in a state machine (e.g., either via software code programming or via a set of rules) of NSMF 212. As described herein, NSMF 212 and/or orchestration engine 220 may be configured to be responsible for performance data collection at the NSSI level by creating measurement jobs on network functions in the NSSIs. NSMF 212 may also be responsible for generating performance data at the network slice interface level, wherein the performance data can include network traffic load data of the entire network slice instance that indicates a total user traffic level and/or a total signalling traffic level that are present within a network slice instance. The performance data generated at the network slice interface level can also include service performance data that is provided by the network slice instance. In some embodiments, the service performance data includes the total user traffic, the signalling traffic, and quality of service data (e.g., QoS data of service can indicate whether the network slice instance delivers services at an expected QoS level) that corresponds to a particular service instance. Moreover, NSMF 212 can be configured to conduct management and orchestration of network slice instances based on the performance data and service performance data as well as providing performance feedback to an operator along with snapshots of network slice instances for updates at NSSF 216 (e.g., to be used by 5G NFs). As an illustration, FIG. 3 depicts a network slice instance architecture diagram according to an embodiment of the subject matter described herein. For example, system 300 includes a NSSF 304, a NSMF 302, and a number of network slice instances 301-303 (e.g., NSI-X, NSI-Y, and NSI-Z) that have been generated/spawned and are supported by NSMF 312. Although only three network slice instances are depicted in FIG. 3, any number of network slice instances can be supported by NSMF 312 and/or NSSF 316 without departing from the scope of the disclosed subject matter. In addition, as shown in FIG. 3, each of network slice instances 301-303 includes a plurality of network slice subnet instances. For example, network slice instance 301 includes network slice subset instances 311-312. Moreover, each of the network slice subset instances 311-332 depicted in FIG. 3 includes one or more underlying network functions and/or NF services. The communication links connecting NSMF 302 and network slice subset instances 311-332 can assist with facilitating performance feedback from network slice instances and/or network slice instance level updates based on policies. For example, NSMF 302 orchestrates the management of various network slices by utilizing the communications links to collect performance and/or metric information regarding the network slice instances, the network slice subset instances, and the underlying network functions. Likewise, the communication link connecting NSMF 302 and NSSF 304 can be used to communicate network slice instance level policies and thresholds without the need for an operator or a system administrator. In addition, performance feedback can also be used by NSMF 302 to push network slice instance updates to NSSF 316 in the manner described below (e.g., method 400 in FIG. 4).

Returning to FIG. 2, NSSF 216 and/or orchestration engine 220 is configured to register its network function profile with NRF 214. In particular, NSSF 216 sends an NF profile registration message 201 that includes the services offered by NSSF 216 to NRF 214. As indicated above, NSSF 216 is responsible for maintaining network slice instance information of the network slices the NSSF supports along with the related network slice instance identifiers (e.g., NSI-IDs). After receiving registration message 201, NRF 214 registers and records the NF profile of NSSF 216 and its associated services in a local registry. In a similar manner, NSMF 212 also registers its NF profile and offered services with NRF 214. As shown in FIG. 2, NSMF 212 sends an NF profile registration message 202 that includes its NF profile and its services offered by NSMF 212. Notably, the registration message 202 further designates NSMF 212 as a custom network function (i.e., a "CUSTOM NF" identifier) to NRF 214.

After registering as a custom network function, NSMF 212 and/or orchestration engine 220 can be configured to subscribe with NRF 214 to receive status update information from designated NFs (e.g., NF network traffic load level information/updates/changes). In particular, NSMF 212 and/or orchestration engine 220 sends a subscription request message 203 in order to request and receive the network traffic load levels for the network functions (and associated NF services) that are instantiated and/or belonging to the network slice instances spawned by NSMF 212. For example, NSMF 212 subscribes to NRF 214 in order to request the capacities and the performance metric data pertaining to the network functions that are registered with NRF 214. Notably, this information includes changes in the traffic load levels in all of the network functions running in the network slice instances that NSSF 216 is managing.

In response to subscribing to network traffic load levels with NRF 214, NSMF 212 is configured to receive notification messages pertaining to the network traffic load information of all the network functions from NRF 214. In particular, all of the network functions and network function services are configured to share their network traffic load level data with NRF 214 via NF-NRF heartbeat messages. For example, if a network function in a particular network slice instance (that is supported by NRF 214) happens to experience a network traffic overload condition, the overloaded network function will report this change related to its target network traffic capability to NRF 214. Since NSMF 212 is subscribed to NRF 214 for network function status updates, NSMF 212 will promptly receive this network traffic load level change information from the NRF 214. For example, NSMF 212 and/or orchestration engine 220 may be configured to receive at least one subscription report message 204 from NRF 214 in real time. Notably, subscription report message 204 contains information that includes changes to the network traffic load levels corresponding to one or more of the network functions associated with network slice instances generated/spawned by NSMF 212 and supported by NRF 214.

In block 205, NSMF 212 and/or orchestration engine 220 is configured to process the network traffic load levels and apply local policies at the network slice instance layer. In some embodiments, NSMF 212 and/or orchestration engine 220 can be provisioned or configured with local policies that are directed to the orchestration and management of network slices. Specifically, NSMF 212 and/or orchestration engine 220 can be provisioned with policies that can be used to determine whether a particular traffic load level change experienced by a network function associated with a supported network slice instance needs to be addressed and/or remedied. For example, NSMF 212 and/or orchestration engine 220 may be configured to process the changes pertaining to the network traffic load levels of network functions when notified by NRF 214. NSMF 212 can also utilize the policies and configured network traffic load thresholds (e.g., operator provisioned load thresholds) for performing network slice management tasks to assess whether specific changes to the network slice instance(s) is needed. For example, if the network traffic load level change experienced by the network function exceeds a predetermined threshold defined by the policy, NSMF 212 and/or orchestration engine 220 can be configured to modify the characteristics of the underlying network slice instance (e.g., adjust/increase additional network resources for the network slice, such as compute, RAM, storage, etc.). In response to determining that the network slice instance and/or network functions need to be changed, NSMF 212 and/or orchestration engine 220 can utilize the local policies to generate network slice instance configuration data that includes the updated NSI configuration that can be used by NSSF 216 for implementation. In some embodiments, the network slice management tasks can include, but are not limited to, creating the network slice instances, updating the network slice instances, removing the network slice instances, and/or the like. In some embodiments, this information may be based entirely on PLMNs since a network slice that is supported beyond the PLMN would indicate that NSMF 212 may need to interact with NRFs existing outside the purview of NSMF 212.

In some embodiments, NSMF 212 and/or orchestration engine 220 can be configured to send the network slice instance configuration information (e.g., NSI configuration changes) to NSSF 216 in update message 206. For example, in response to the NSI network traffic load level updates that are received in report message 204 and subsequently processed in block 205, NSMF 212 and/or orchestration engine 220 may be configured to "push" the produced NSI configuration information to NSSF 216 in real time. For example, update message 206 can be provided by NSMF 212 to NSSF 216 via a push mechanism (i.e., a send message) immediately after the receiving and processing of the NF status update information (e.g., network traffic load level change information). In some embodiments, NSSF 216 can be configured to expose REST APIs (and/or a new interface) that can be used by NSMF 212 in order to facilitate the provisioning of the network slice information level updates to the NSSF as described above.

In response to receiving the network slice instance configuration information, NSSF 216 may be configured to implement the network slice instance changes (i.e., at NSSF 216) for its supported consumer NFs. For example, NSSF 216 can utilize the NSI configuration information to change the characteristics of specific network slice instances. In addition, NSSF 216 may immediately begin using the received configuration information to answer network slice selection service request messages (e.g., Nnssf_NSSelection_Get service requests) received from AMFs (or other NSSFs).

In some alternate embodiments, NSSF 216 can be configured to pull or request the network slice instance configuration information from the NSMF 212. For example, NSSF 216 may issue a NSI configuration information request message to NSMF 212 via a REST API. In such scenarios, the NSSF 216 may initially subscribe to the NSMF 212 to establish permissions to request the updated NSI configuration information stored at the NSMF 212.

Figure 4:
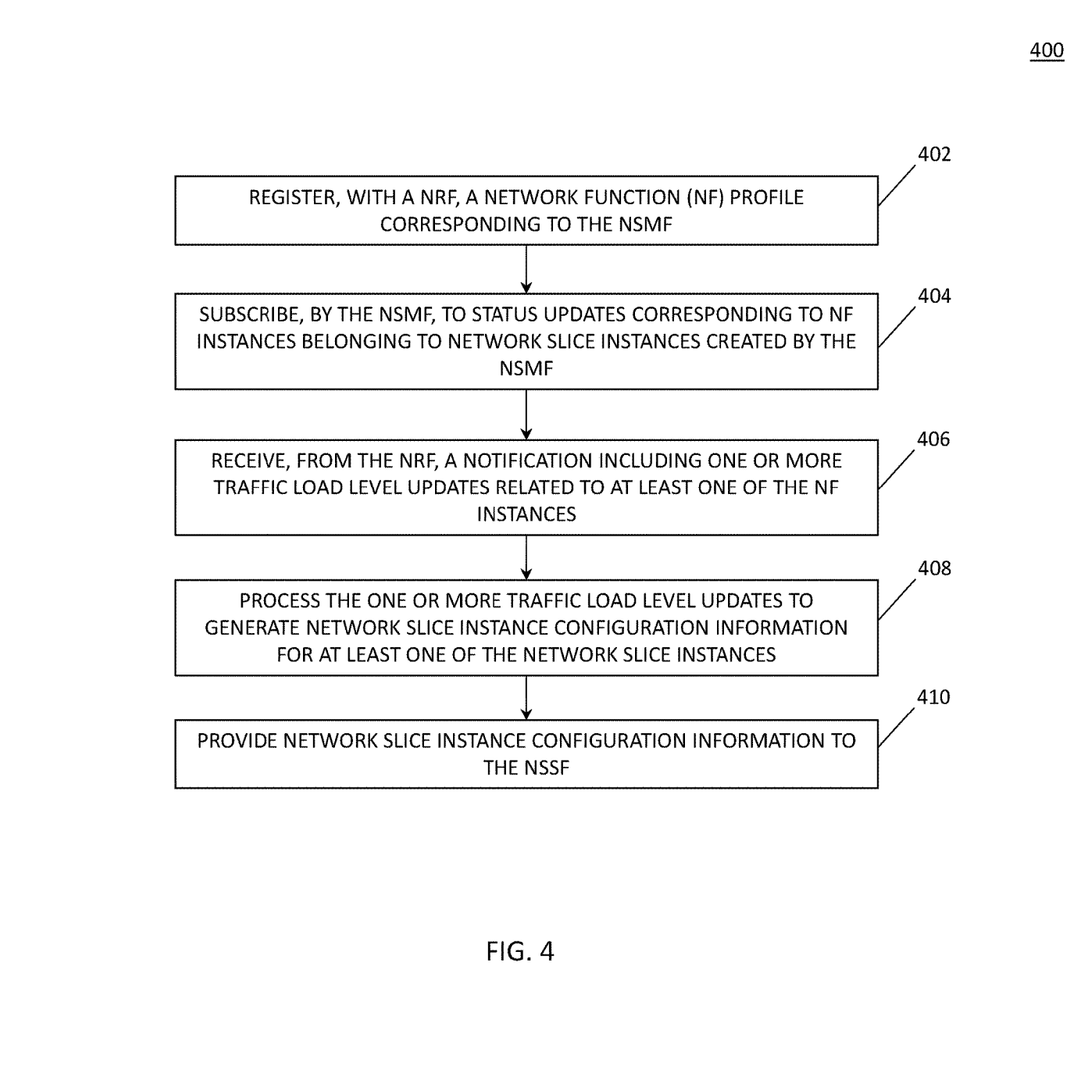
FIG. 4 is a flow chart illustrating an exemplary process for establishing message priority in network slices based on QoS parameters according to an embodiment of the subject matter described herein.

FIG. 4 is a flow chart illustrating an exemplary process or method 400 for providing updated network slice information to a NSSF according to an embodiment of the subject matter described herein. In some embodiments, method 400 depicted in FIG. 4 is an algorithm, program, or script (e.g., orchestration engine 220 as shown in FIG. 2) stored in memory that when executed by a processor performs the steps recited in blocks 402-410. In some embodiments, orchestration engine represents a list of steps (or changes in steps) embodied in the state machine (e.g., either via software code programming or via a set of rules) of the NSMF.

In block 402, an NF profile corresponding to the NSMF is registered with an NRF. More specifically, the NSMF registers its NF profile (which includes the NSMF services) with the NRF. Notably, the registration message indicates the NSMF as a custom NF. As indicated above, the NSMF does not typically register with the NRF because the NSMF is typically configured to handle the network slice orchestration duties per the 3GPP standards. It should also be noted that the NSSF(s) supported by the NSMF also registers (or has registered) its NF profile with the NRF as per 3GPP TS 29.510.

In block 404, status updates (e.g., network traffic load level data) corresponding to NF instances belonging to network slice instances (created by the NSMF) is subscribed to. More specifically, the NSMF subscribes to network traffic load level updates corresponding to network functions (and containing NF services) that were instantiated as part of network slice instances the NSMF has spawned.

In block 406, a notification message including one or more network traffic load level changes occurring in the NF instances is received. In some embodiments, the NSMF receives the network traffic load level change notification message from the NRF. Notably, by subscribing to the NFR, the NSMF will receive NF network traffic load level update information from the NRF when the supported network functions (e.g., NFs in network slice instances spawned by the NSMF) experience a change in their traffic target levels. In particular, the network functions in various network slice instances are configured report their network traffic load level changes to the NRF (which in turn reports the changes to the subscribed NSMF).

In block 408, the one or more network traffic load level changes are processed to generate network slice instance configuration information for at least one of the network slice instances. In some embodiments, the NSMF is configured and/or provisioned with local policies that can be utilized by the orchestration engine to orchestrate the existing set of network function resources that are allocated to different network slice instances respond by the NSMF. The NSMF is configured, upon receiving notification of traffic load level changes, to orchestrate the network slice update information in order to accommodate the traffic load level changes in the supported network slice instances. For example, the NSMF can conduct postprocessing procedures to add more resources to network slice instances that are experiencing overloading conditions.

In block 410, network slice instance configuration information is provided to the NSSF. In some embodiments, the NSMF sends (i.e., "pushes") the new/updated network slice instance configuration information to the NSSF. Notably, the network slice instance configuration information includes the modifications/changes to the network slice instances as determined by the NSMF and/or the orchestration engine. Moreover, the NSSF is configured to expose REST APIs to allow provisioning of the NSI configuration information updates from the NSMF. After receiving the updated network slice instance configuration information, the NSSF may be configured to begin utilizing the updated NSI information to answer network slice selection service request messages (e.g., Nnssf_NSSelection_Get service request messages).

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 23.501; $3^{rd}$ Generation Partnership Project; Technical Specification Group Services and System Aspects; System Architecture for the 5G System; Stage 2 (Release 17), V17.1.0 (2021-03)
2. 3GPP TS 29.531; $3^{rd}$ Generation Partnership Project; Technical Specification Group Core Network and Terminals; Network Slice Selection Services; Stage 3 (Release 17), V17.1.0 (2021-03)
3. 3GPP TR 28.801; $3^{rd}$ Generation Partnership Project; Technical Specification Group Services and System Aspects; Telecommunication management; Study on management and orchestration of network slicing for Next Generation Network; (Release 15), V15.1.0 (2018-01)
4. 3GPP TS 28.531; $3^{rd}$ Generation Partnership Project; Technical Specification Group Services and System Aspects; Management and Orchestration; Provisioning; (Release 16), V16.9.0 (2021-03)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing updated network slice information to a network slice selection function (NSSF), the method comprising:
   registering, by a network slice management function (NSMF) with a network function (NF) repository function (NRF), an NF profile corresponding to the NSMF;
   subscribing, by the NSMF with the NRF, for status updates corresponding to NF instances belonging to network slice instances created by the NSMF;
   receiving, by the NSMF from the NRF, a notification message including one or more network traffic load level updates for each of the NF instances;
   processing the one or more network traffic load level updates to generate network slice instance configuration information for at least one of the network slice instances; and
   providing, by the NSMF, the network slice instance configuration information to an NSSF that provides network slice selection assistance information (NSSAI) and network slice selection service to NFs seeking to access network slice services.

2. The method of claim 1 wherein the network slice instance configuration information includes instructions for creating additional network slice instances, modifying the network slice instances, or removing one or more of the network slice instances.

3. The method of claim 1 wherein the network slice instance configuration information is provided to the NSSF via an update message pushed by the NSMF.

4. The method of claim 1 wherein the NSSF is configured to request the network slice instance configuration information from the NSMF via a pull message.

5. The method of claim 1 wherein the NSSF is configured to utilize the network slice instance configuration information to respond to network slice selection service request messages.

6. The method of claim 1 wherein the NSMF registers with the NRF as a custom NF.

7. A system for providing updated network slice information to a network slice selection function (NSSF), the system comprising:
   a network slice management function (NSMF) including at least one processor and a memory; and
   an orchestration engine stored in the memory and implemented by the at least one processor for registering with a network function (NF) repository function (NRF) an NF profile corresponding to the NSMF, subscribing with the NRF for status updates corresponding to NF instances belonging to network slice instances created by the NSMF, receiving from the NRF a notification message including one or more network traffic load level updates for each of the NF instances, processing the one or more network traffic load level updates to generate network slice instance configuration information for at least one of the network slice instances, and providing the network slice instance configuration information to an NSSF that provides network slice selection assistance information (NSSAI) and network slice selection service to NFs seeking to access network slice services.

8. The system of claim 7 wherein the network slice instance configuration information includes instructions for creating additional network slice instances, modifying the network slice instances, or removing one or more of the network slice instances.

9. The system of claim 7 wherein the network slice instance configuration information is provided to the NSSF via an update message pushed by the NSMF.

10. The system of claim 7 wherein the NSSF is configured to request the network slice instance configuration information from the NSMF via a pull message.

11. The system of claim 7 wherein the NSSF is configured to utilize the network slice instance configuration information to respond to network slice selection service request messages.

12. The system of claim 7 wherein the network slice instance configuration information is provided by the NSMF to the NSSF in real time.

13. The system of claim 7 wherein the NSMF registers with the NRF as a custom NE.

14. A non-transitory computer readable medium having stored thereon executable instructions that when executed by a processor of a computer control the computer to perform steps comprising:
   registering, by a network slice management function (NSMF) with a network function (NF) repository function (NRF), an NE profile corresponding to the NSMF;
   subscribing, by the NSMF with the NRF, for status updates corresponding to NF instances belonging to network slice instances created by the NSMF;
   receiving, by the NSMF from the NRF, a notification message including one or more network traffic load level updates for each of the NF instances;
   processing the one or more network traffic load level updates to generate network slice instance configuration information for at least one of the network slice instances; and
   providing, by the NSMF, the network slice instance configuration information to a network slice selection function (NSSF) that provides network slice selection assistance information (NSSAI) and network slice selection service to NFs seeking to access network slice services.

15. The non-transitory computer readable medium of claim 14 wherein the network slice instance configuration information includes instructions for creating additional network slice instances, modifying the network slice instances, or removing one or more of the network slice instances.

16. The non-transitory computer readable medium of claim 14 wherein the network slice instance configuration information is provided to the NSSF via an update message pushed by the NSMF.

17. The non-transitory computer readable medium of claim 14 wherein the NSSF is configured to request the network slice instance configuration information from the NSMF via a pull message.

18. The non-transitory computer readable medium of claim 14 wherein the NSSF is configured to utilize the network slice instance configuration information to respond to network slice selection service request messages.

19. The non-transitory computer readable medium of claim 14 wherein the network slice instance configuration information is provided by the NSMF to the NSSF in real time.

* * * * *

UNITED STATES PATENT AND TRADEMARK OFFICE
CERTIFICATE OF CORRECTION

PATENT NO. : 11,910,306 B2
APPLICATION NO. : 17/382299
DATED : February 20, 2024
INVENTOR(S) : Goel et al.

It is certified that error appears in the above-identified patent and that said Letters Patent is hereby corrected as shown below:

On the Title Page

Column 2, under item (57) Abstract, Line 2, delete "(NSSF" and insert -- (NSSF) --, therefor.

On page 2, Column 2, under item (56) Other Publications, Line 18, delete "usecase" and insert -- use case --, therefor.

In the Specification

In Column 4, Line 62, after "utilize" delete "15".

In Column 6, Line 4, delete "land network" and insert -- land mobile network --, therefor.

In Column 9, Line 63, delete "NFR," and insert -- NRF, --, therefor.

In the Claims

In Column 12, Line 17, in Claim 13, delete "NE." and insert -- NF. --, therefor.

In Column 12, Line 24, in Claim 14, delete "NE" and insert -- NF --, therefor.

Signed and Sealed this
Fourteenth Day of May, 2024

Katherine Kelly Vidal
*Director of the United States Patent and Trademark Office*